3,408,157
PROCESS FOR RECOVERY OF AMMONIUM SALTS FROM PROCESS WASTE STREAMS AND DISPOSAL THEREOF
Arthur F. Miller, Lyndhurst, and Milena L. Salehar, Cleveland Heights, Ohio, assignors to The Standard Oil Company, Cleveland, Ohio, a corporation of Ohio
No Drawing. Filed June 1, 1966, Ser. No. 554,334
9 Claims. (Cl. 23—100)

ABSTRACT OF THE DISCLOSURE

The instant application relates to the recovery of ammonium salts from a waste water stream in a facility for the manufacture of acrylonitrile and/or methacrylonitrile by the vapor phase catalytic oxidation of propylene and/or isobutylene in the presence of ammonia. The ammonium salts recovered are formed when excess ammonia present in the reactor effluent is neutralized by a mineral acid, most preferably dilute sulfuric acid, which forms ammonium sulfate and ammonium bisulfate.

---

The present invention relates to the recovery of ammonium salts from waste process streams in a manufacturing facility for $\alpha$-$\beta$ monoolefinically unsaturated nitriles. More particularly, the present invention is concerned with the recovery of ammonium salts from the waste-water stream which emanates from the bottom of a waste-water distillation column used in plants for the manufacture of acrylonitrile and methacrylonitrile.

Processes and catalysts for the manufacture of acrylonitrile and methacrylonitrile by the ammoxidation of propylene and isobutylene, respectively, have been described in U.S. Patents Nos. 3,152,170; 3,153,085; 3,197,419; 3,198,750; 3,200,081; 3,200,084; 3,200,141; and, British Patent No. 987,960. In each of these processes a slight excess of ammonia is used. Some of this excess ammonia is carried off in the reactor effluent and is absorbed by a dilute acid forming a solution of ammonium salts. The saline solution, from one point of view, is a disposal problem and from another, it is a potential source of fertilizer grade salts. The economics of recovering the salts and successfully disposing of the remaining waste-water are closely linked to the profitable operation of the acrylonitrile or methacrylonitrile plants.

It is an object of this invention to separate ammonium salts formed in the quenching step of the acrylonitrile manufacturing process from heavy organic byproducts in the quench solution.

It is a further object of this invention to separate crystalline commercially-salable ammonium salts from a "waste-water" stream which has been stripped of acrylonitrile and other desirable volatile organic products of reaction.

It is another object of this invention to insolubilize the heavy organic content, also called "heavies," of this waste-water stream stripped of acrylonitrile to concentrate the "heavies" as well as the desirable ammonium salts and to permit this concentrated mass to be leached with water so that the ammonium salts are removed by dissolution and the "heavies" are left behind to be disposed of.

The following general description of the instant invention is specific with respect to an acrylonitrile plant but is equally applicable, with obvious modifications, to a methacrylonitrile plant.

In U.S. Patent No. 2,904,580, filed September 20, 1957, a process is described for the manufacture of acrylonitrile which comprises the gaseous phase catalytic reaction of propylene, ammonia and molecular oxygen-containing gas. In this vapor phase catalytic reaction preferably carried out in a fluidized bed-type reactor, a part of the ammonia which is introduced as feed to the reactor is unreacted and consequently the effluent gases from the reactor contain, in addition to acrylonitrile, a small but nevertheless appreciable amount of ammonia, as well as some unreacted feed materials such as propylene, oxygen and nitrogen. The reactor effluent will also usually contain other reaction products such as hydrogen cyanide, acetonitrile, etc.

Acrylonitrile, which is the principal product of the aforesaid process, may be recovered from the reactor effluent gases by scrubbing the hot gases with a suitable solvent such as water or a glycol such as ethylene glycol, or a mixture of such solvents, in an absorber or quench tower. This is preferably done after briefly heat-exchanging the effluent reactor gases with incoming feed gases and then leading the reactor effluent gases into the bottom of a quench tower in which it is countercurrently scrubbed with aqueous dilute acid. Any mineral acid may be used, but is is preferred to use an acid, the ammonium salt of which has good fertilizer value or a ready market. Such preferred acids are phosphoric, nitric, sulfuric and hydrochloric acids. The dilute mineral acid reacts with ammonia and makes it unavailable for the formation of by-products resulting from the direct reaction of ammonia and acrylonitrile such as $\beta$-aminopropionitrile, $\beta$-$\beta'$ imino dipropionitrile and $\beta$-$\beta'$-$\beta''$ nitrilo tripropionitrile. Despite the speed of the absorption of the ammonia by the dilute acid, cyanoethylation of the ammonia does take place, as not all the excess ammonia in the reactor effluent gases can be removed quickly enough. As a result, these cyanoethylated products react with other constituents of the reactor effluent stream and form various polymers. Some of them are of high molecular weight and most of them are characteristically soluble in water, with the result that the stream issuing from the bottom of the quench tower is a dilute water solution of the ammonium salts of the mineral acid used, containing some acrylonitrile and other desirable products of reaction, and contaminated with organic "heavies" in solution. Some of these heavies comprise partially hydrolyzed polyacrylonitrile, polyacrylamide, polymers of unsaturated aldehydes and unsaturated ketones, cyanhydrins and various cyanoethylated byproducts.

In a subsequent step, the bottoms from the quench tower is fractionated in a waste-water column, the overhead from which contains some acrylonitrile and other desirable organic compounds such as acetonitrile, hydrogen cyanide, proprionitrile, etc., which are led into a refrigerated absorber. The bottoms from the waste-water column is a waste process stream, called a waste-water stream when water is the solvent used in the quench tower, the treatment of which stream is the subject of the instant invention.

Efforts to recover the valuable ammonium salts by removing water from this waste-water stream, which is a dilute solution, thus concentrating it, have heretofore been unsuccessful mainly because organic "heavies" precipitated from solution quickly plugged the equipment long before the solution was concentrated sufficiently to precipitate the salt from it.

We have now discovered an unexpectedly effective process for recovering solutions of ammonium salts from a waste process stream in facilities for manufacturing $\alpha$-$\beta$ monoolefinically unsaturated nitriles by adding a mineral acid to the waste process stream, and heating the acidified stream under autogenous pressure so that organic heavies are insolubilized as solids which may be easily separated from the liquid phase which is then concentrated by removal of water. Moreover, the addition of mineral acid to the waste process stream makes it possible to recover more ammonia in the form of ammonium salts than theoretically corresponds to the titratable ammonia in the waste process stream because the acid, surprisingly, hydrolyzed CN groups in complex organics to split off free ammonia which combines with the mineral acid.

In view of the fact that all excess water must be removed before the ammonium salts may be crystallized out of solution, it will be apparent that the use of concentrated acid is preferred for separating the organic heavies.

The terms "insolubilizing" and "insolubilized" are used herein in a general sense because the acid forms compounds the precise composition of which are not known, but it is speculated that these compounds condensed, include polymerized and partially hydrolyzed products of organic compounds formed in the reactor between propylene, ammonia and oxygen.

The process of this invention may be practiced continuously, intermittently, or batch-wise. The following is a more detailed description of a specific embodiment of the continuous process of the instant invention wherein the $\alpha$-$\beta$ monoolefinically unsaturated nitrile is acrylonitrile, the solvent used in the quench tower is water, the mineral acid used for neutralization is dilute sulfuric acid and the mineral acid used to insolubilize the heavies is concentrated sulfuric acid.

Feed comprising propylene, ammonia and air is led into a fluidized bed reactor wherein the ammoxidation of propylene yields acrylonitrile including some byproducts and unreacted ammonia, nitrogen, etc. This reactor effluent stream is heat-exchanged with incoming reactants in a shell-and-tube heat exchanger and the cooled effluent, at about 300–600° F., is led into the bottom of a quench tower. The reactor effluent gases flow upward and countercurrent to a downflowing stream of water acidified with sulfuric acid which is sprayed from the top of the quench tower. Substantially all of the ammonia not reacted in the reactor is absorbed by the sulfuric acid forming ammonium sulfate and ammonium bisulfate which stay in solution in the aqueous stream. The proportions of ammonium sulfate and ammonium bisulfate formed can be adjusted by varying the strength and quantity of acid. Some acrylonitrile is also dissolved in this stream along with relatively nonvolatile and relatively heavy water-soluble organics formed as byproducts. The bottoms from the quench tower containing dissolved ammonium sulfate and ammonium bisulfate and organic heavies is pumped from the bottom at a temperature of about 100–180° F. The major portion of this stream is recycled back to the top of the quench tower, the other portion being led to a waste-water column. A makeup stream comprising sulfuric acid is continually sprayed into the top of the quench tower. The waste-water column is a conventional distillation column wherein desirable volatile organics such as acrylonitrile, acetonitrile, and the like are distilled off, about 25 to 90 percent of the feed to the column being taken overhead and led to an absorber. The bottoms from the waste-water column contains ammonium sulfate and ammonium bisulfate and dissolved heavy organic matter from which the ammonium salts are to be recovered. This stream contains from about 2 to about 20 percent ammonium sulfate and ammonium bisulfate, from about 1 to about 40 percent organic heavies in solution, along with from about 0.1 to 2 percent cyanide (as titrated) this being composed chiefly of cyanhydrin and some hydrogen cyanide. The waste-water bottoms stream is usually slightly acid. A typical composition of the waste-water column bottoms stream is shown in Table I.

Concentrated sulfuric acid, in the range of from about 0.2 to about 10 percent by weight of the waste-water column bottoms is injected into the waste-water column bottoms and the mixture led into a jacketed pressure vessel provided with a condenser from which condensate may be withdrawn under pressure.

Heating under autogenous pressure aids insolubilization of the heavies. The heat may be applied by simultaneous direct injection of superheated steam, heat transfer to the liquid mass from a hot heat exchange fluid circulated through the jacket of the vessel, and subsurface combustion, or by any one of these or other well-known methods. Preferred heat exchange fluids are hot oils, molten salts and the like. The acidified waste-water column bottoms is maintained under pressure by approximate valving means well known to those skilled in the art.

It has been found that the higher the temperature and pressure the more completely and quickly the hydrogen cyanide (HCN) is removed by reaction as evidenced by the absence of titratable HCN. Similarly, conditions of higher temperature and pressure promote hydrolysis of waste organic cyanides as evidenced by the increase in titratable ammonia at these conditions. Further it was found that ammonium bisulfate ($NH_4HSO_4$) present in the waste-water column bottoms is more rapidly transformed to ammonium sulfate under conditions of higher temperature and pressure.

Accordingly, it is desirable and expedient for the insolubilization reaction that the liquid in the pressure vessel may be heated for from about 0.25 to about 10 hours, depending upon the mass of liquid in the vessel and the rate at which the liquid is brought to a predetermined temperature under autogenous pressure. It is preferred to keep the liquid at a predetermined temperature in the range of 250° F. to 600° F. for about 0.25 to about 2 hours. It will be readily seen that longer heating times with concurrent withdrawal of aqueous condensate will result in more concentrated solutions of ammonium sulfate and ammonium bisulfate so that upon cooling crystals will be thrown out of solution at least some of which will adhere to the organic solids filtered out. In the preferred method of practicing the instant invention substantially all of the crystals will be ammonium sulfate.

It is to be noted that though the absorption acid and the insolubilization acid used in the specific embodiment described above are the same mineral acid, it is not essential that this be so. It is preferred that they be the same, however, to avoid a further step of purification of crystals of different ammonium salts, if the crystals of each salt be desired.

Following insolubilization of organic heavies the liquid from the pressure vessel is cooled by heat exchange with a cool fluid or by standing at ambient temperature in a settling tank whereupon additional quantities of organic heavies may settle out. Alternatively, following insolubilization of organic heavies, the hot liquid from the pressure vessel may be filtered and then cooled. Any organic heavies thrown out of solution in the cooled liquid may then be separated by a second filtration. It is preferred to cool the liquid and then filter out the solids. The filtrate is a solution of ammonium sulfate and ammonium bisulfate, some of which is adsorbed on the organic solids filtered out.

The organic matter filtered from the cool, relatively, concentrated solution along with any crystallized ammonium sulfate and ammonium bisulfate adhering to the organic matter is then leached with water in the temperature range of from about 40 to 210° F. It is preferred that the water temperature be in the range of from about 60° F. to 180° F.

The dilute aqueous salt solution obtained from the leaching step is substantially free of organic heavies. This solution may be concentrated by removal of water by any of several well-known means. For example, the dilute solution may be heated either by heat exchange with a hot surface, or by direct submerged combustion of gasses under the surface of the liquid, or by dialysis through a semipermeable membrane, or by ion-exchange using an acidic ion-exchange resin such as carboxylic ion-exchange resins. Another method of removing water from the solution, which might have particular utility under specially favorable conditions, is by freezing and fractional crystallization, forming ice crystals which would be continuously skimmed off. A preferred method of removing diluent water from the ammonium salt solution is by subsurface direct-combustion-evaporation in a conical bottom evaporator wherein the evaporation is preferably effected by submerged combustion in a central "evaporation zone." As diluent water is removed as vapor, the dissolved-solids content of the liquid in the "evaporation zone" increases, the density of the liquid in the zone increases and the resulting concentrated solution gravitates to the apex of the conical evaporator.

The concentrated solution from the evaporator is cooled and run into a crystallizer where crystals of ammonium sulfate and ammonium bisulfate are precipitated out of solution. The crystals may be freed of adhering salt solution by centrifuging or by filtration or by sedimentation. A preferred manner of separation is by centrifuging the crystals. They are then dried in an oven and packed. Mother liquor from the centrifuge may be recycled to the evaporator.

Crystals obtained in the manner described above are light brown and impure. They may be purified, if desired, by any of several methods well known in the art. For example, the crystals may be redissolved in water and recrystallized. Another method of purifying impure crystals is to redissolve them in hot water to form a relatively concentrated salt solution to which is added about 10 to about 60 percent by weight methanol. Crystallization from the alcoholic salt solution yields pure white crystals.

In the following examples, all quantities described as "parts" refer to parts by weight unless specifically stated.

Example I 600 parts of waste-water column bottoms (composition shown in Table I) were weighed into a jacketed vessel fitted with a condenser for the effluent vapors, and provided with a pressure lock whereby the condensate could be removed from the system under autogenous pressures developed therein. 11.04 parts of concentrated sulfuric acid (96–98%) were mixed into the waste-water column bottoms in the vessel. The system was sealed and the temperature in the jacket of the vessel was raised to about 350° F. for about 1 hour. 270 parts of volatiles were distilled overhead, condensed and removed from the system. The vessel was then vented to atmospheric pressure, and the solution from the vessel was run out and cooled to room temperature (72° F.) during which time the insolubilized heavies formed during the heating step separated out and floated in the solution. The entire mixture was filtered, the insolubilized heavies on the filter paper were dried and were found to weigh 22.3 gms.

The filtrate was placed on a water bath and water vapor removedh-.jion 3 filtrate was then removed from the water bath and cooled whereupon light brown sulfate crystals of ammonia crystallized out of solution. The mixture was centrifuged and the saturated solution was returned to the water bath. The crystallization and centrifuging steps were repeated. The small quantity of solution obtained from the second centrifuging step was discarded. The crystals obtained from both crystallization steps were dried in an oven at 280° F. A yield of 46.5 gms. of dry crystals was obtained. Analysis indicated the crystals were substantially all ammonium sulfate.

Since the waste-water column bottoms contains 1.65 weight percent $NH_3$ by titration (see Table I) and the salt obtained is $(NH_4)_2SO_4$, the quantity of salt corresponding to the titrated ammonia is $$\frac{1.65}{34} \times 132 = 6.4\% \ (NH_4)_2SO_4$$

The charge to the vessel contains $$600 \times .064 = 38.4 \text{ gms. } (NH_4)_2SO_4$$

It will be apparent that more (46.5−38.4=8.1 gms.) ammonium sulfate crystals were recovered than was present corresponding to the titratable ammonia in the waste-water column bottoms originally. Two factors contribute to this increase:

(a) The sulfate contribution of at least some of the 11.04 gms. concentrated sulfuric acid (96%) equivalent to $$11.04 \times 0.96 \times \frac{96}{98} = 10.4 \text{ gms. } SO_4''$$

and, (b) An indeterminate amount of ammonia released by hydrolysis of (CN) groups on waste organics.

Example II

The procedure of Example I was repeated except that after the entire mixture was filtered, the insolubilized heavies on the filter paper were leached with 100 cc. of water at 50° C. The filtrate obtained from this leaching step is added to the cool relatively concentrated filtrate obtained from the previous step. The leached insolubilized heavies on the filter paper were dried and were found to weigh 20.6 gms.

The combined filtrate was placed on a water bath, concentrated and the crystals obtained were dried as in the previous example. A yield of 47.9 gms. of dry crystals was obtained.

Analysis indicated the salt was essentially ammonium sulfate.

Example III 600 parts of waste-water column bottoms (composition shown in Table I) were weighed into a jacketed vessel filtered with a condenser for the effluent vapors, and provided with a pressure lock whereby the condensate could be removed from the system under autogenous pressures developed therein. 25 parts of concentrated hydrochloric acid (36% by weight) were mixed into the waste-water column bottoms in the vessel. The system was sealed and the temperature in the jacket of the vessel was raised to about 400° F. for about 1 hour. 400 parts of volatiles were distilled overhead, condensed and removed from the system. The vessel was then vented to atmospheric pressure, and the solution from the vessel was run out and filtered hot whereupon the insolubilized heavies formed during the heating step were deposited on the filter paper; when the hot filtrate was cooled to room temperature an additional small amount of insolubilized heavies floated to the surface and light brown crystals were thrown out of solution. The floated insolubilized heavies were skimmed off and added to the insolubilized heavies deposited on the filter paper. The combined insolubilized heavies were dried and found to weigh 23.3 gms.

The crystals in the saturated supernatant salt solution were redissolved in distilled water and analyzed. The analysis indicated that 75 percent by weight were $(NH_4)_2SO_4$ crystals and the remaining were $NH_4Cl$ crystals.

Example IV 600 parts of waste-water column bottoms (composition shown in Table I) were weighed into a jacketed vessel fitted with a condenser for the effluent vapors, and provided with a pressure lock whereby condensate could be removed from the system under autogenous pressures developed therein. 14.2 parts of concentrated orthophosphoric acid (88%) were mixed into the waste-water column bottoms in the vessel. The system was sealed and the temperature in the jacket of the vessel was raised to about 400° F. for about 1 hour. 450 parts of volatiles were distilled overhead, condensed and removed from the system. The vessel was then vented to atmospheric pressure, and the solution from the vessel was run out and filtered hot whereupon the insolubilized heavies formed during the heating step separated out and floated. When the hot filtrate was cooled to room temperature an additional small amount of insolubilized heavies separated out of solution and floated to the surface and brown crystals were thrown out of solution. The floated insolubilized heavies were skimmed off and added to the insolubilized heavies deposited on the filter paper. The combined insolubilized heavies were dried and found to weigh 21.8 gms.

The crystals in the saturated supernatant salt solution were centrifuged and dried in an oven at 280° F. The dried crystals weighed 39.6 gms. The centrifuged solution was placed on a water bath and evaporated to dryness leaving moist brown crystals, which after drying at 280° F. were found to weigh 6.9 gms. Upon analysis, the crystals were identified as ammonium phosphate and ammonium sulfate crystals.

TABLE I

Characterization of waste-water column bottoms obtained from Lima acrylonitrile plant on June 26, 1964

9.57 wt. percent solids (slow evapn. to dryness, 6 hrs. at 120° C.)
0.48 wt. percent cyanide
1.65 wt. percent $NH_3$ by titration
pH of 4.9–5.0
1.47% sulfur
Chemical oxygen demand, 45,404, 46,754, 44,022 p.p.m.
Total nitrogen of 2.17%

| Nitrogen types: | Percent |
|---|---|
| Nitrate | 0.0061 |
| Nitrite | 0.054 |
| Amide | 0.31 |
| $NH_3$ | 1.37 |
| Nitrile (by difference) | 0.42 |

| G.C.-M.S. analysis: | Percent |
|---|---|
| Acetaldehyde | 0.1 |
| Acrolein | 0.02 |
| HCN | 0.4 |
| Acetic acid | 0.2 |
| Fumaronitrile | 0.05 |
| Acrylic acid | 0.03 |
| Acrylamide | 0.1 |

Color similar to strong tea or coffee. Usually contains some catalyst fines.

We claim:

1. A process for recovering ammonium salt solutions from a waste process stream in a manufacturing facility for $\alpha$-$\beta$ monoolefinically unsaturated nitriles comprising:
   (a) adding to said waste process stream from about 0.2 to about 10 percent by weight of a mineral acid based on the weight of said waste process stream, thus forming an acidic waste process stream,
   (b) heating said acidic waste process stream at from about 250° F. to about 600° F. under substantially autogenous pressure to form a slurry of solid, insoluble organic heavies in said acidic waste process stream,
   (c) separating the solid from the liquid phase of the slurry of (b), and
   (d) concentrating said liquid phase of (c) by removing water therefrom.

2. The process of claim 1 wherein the ammonium salt is at least one member selected from the group consisting of ammonium sulfate, ammonium bisulfate, ammonium nitrate, ammonium chloride and ammonium phosphate, the mineral acid is at least one acid selected from the group consisting of sulfuric, nitric, hydrochloric and phosphoric acids, said acidic waste process stream is heated from about 350° F. to 500° F., and said liquid phase is concentrated to form at least a saturated solution.

3. The process of claim 1 comprising, following step (b) and before step (c), adjusting the pressure to about atmospheric pressure and cooling said acidic waste process stream to a temperature in the range from about 30° F. to about 140° F.

4. The process of claim 2 comprising the additional steps of crystallizing ammonium salts and removing them from said saturated solution.

5. The process of claim 4 comprising the additional step of dissolving the crystallized ammonium salts in water and recrystallizing substantially pure crystals from solution.

6. The process of claim 4 comprising the additional steps of dissolving the crystallized ammonium salts in at least an equal weight of water to form a relatively concentrated solution, adding from about 10 to about 60 percent by weight of a water-soluble alcohol to said relatively concentrated solution, and recrystallizing substantially pure crystals from solution.

7. The process of claim 2 comprising the additional step of concentrating said liquid phase by evaporation of the water, the water content of the concentrate to be in the range from about .01 to about 10 percent by weight of the solids content of said liquid phase.

8. The process of claim 7 comprising the additional step of leaching the claim 7 with a quantity of water at least equivalent in weight to the weight of insolubilized heavies and in the temperature range of from about 40° F. to 210° F., forming an aqueous solution of said ammonium salts and combining it with said liquid phase.

9. The process of claim 4 comprising recovering said crystals by centrifuging them, and recycling the saturated solution centrifuged away from said crystals, to step (d) of claim 1.

References Cited

UNITED STATES PATENTS 2,902,342   9/1959   Kerley _____ 23—103 XR
3,325,534   6/1967   Hardman et al. ____ 23—119 XR OSCAR R. VERTIZ, *Primary Examiner.*

EDWARD STERN, *Assistant Examiner.*